UNITED STATES PATENT OFFICE.

DE WITT C. SANFORD, OF ST. LOUIS, MISSOURI.

POROUS OR SPONGY MINERAL COMPOSITION AND NON-CONDUCTOR OF HEAT.

SPECIFICATION forming part of Letters Patent No. 230,151, dated July 20, 1880.

Application filed March 30, 1880. (Specimens.)

*To all whom it may concern:*

Be it known that I, DE WITT C. SANFORD, of St. Louis, Missouri, have made a new and useful Improvement in Porous or Spongy Mineral Compositions and Non-Conductors of Heat, of which the following is a full, clear, and exact description.

My aim is to provide, at a reasonable cost, a good non-conductor of heat, applicable to boilers, tanks, pipes, or flues to buildings, cars, vessels, refrigerators, safes, water-coolers, stoves, and other places, constructions, and purposes where it is desired to prevent the transmission of heat. The improvement is also applicable to parts of buildings as a non-conductor or deadener of sound; also in some cases where a material of light weight is needed, as in building or in surgery; also as a liquid-conductor to filters, strainers, evaporators, and lamp-wicks; also as an absorbent for various purposes.

The invention consists, mainly, of a compound, chiefly mineral, which I term "mineral sponge," or a compound having a spongy, porous, cellular formation, which is caused by the chemical union of the components of the compound, thereby generating gas while the mixture is in a semi-fluid, moist, and plastic condition, in which mixture, as it sets or hardens, the bubbles of gas become entangled, producing the peculiar formation named.

It further relates to the means used for imparting toughness, hardness, lightness, sponginess, and other properties to the compound, as hereinafter more particularly described.

More distinctly set forth, the improvement consists, principally, of calcined gypsum or plaster-of-paris, (sulphate of lime,) in combination with one or more of the soluble alkaline bicarbonates, preferably the best commercial bicarbonate of soda. When these ingredients, in proper proportions and with a sufficient quantity of water, are well mixed a chemical change takes place and carbonic-acid gas is liberated, producing effervescence in the mixture, after which the mixture sets or hardens, forming an insoluble compound.

If the proper proportions of the ingredients are used and the mixture properly manipulated after mixing and during the setting stage, numberless bubbles of the liberated gas will be entangled in the mixture while it is setting, and the desired cellular formation thereby be produced.

The following formulas produce the best results:

Formula No. 1: Of plaster-of-paris take twenty-four ounces; of bicarbonate of soda, four-elevenths of an ounce; of water, sixteen ounces. This particular compound will set quicker than any of the compounds hereinafter named, and, having no combustible ingredients therein, it is the best in respect to its fire-proof qualities; but it is not so porous and light as the other compounds named.

To make a lighter sponge I add to those above named other ingredients which have the effect of more effectually entangling the gas and of retaining a larger proportion thereof in the mixture. They also permit a change of proportions of the gas-generating ingredients, enabling a larger amount of gas to be generated. The additional ingredients referred to are of a glutinous, mucilaginous, saponaceous, gummy, resinous character. I prefer wheat-flour and pulverized rosin, as follows:

Formula No. 2: Of plaster-of-paris, twenty-four ounces; of bicarbonate of soda, one-half ounce; of flour, one-half ounce; of water, eighteen ounces.

Formula No. 3: Of plaster-of-paris, twenty-four ounces; of bicarbonate of soda, three-fifths of an ounce; of pulverized rosin, one-half ounce; of water, eighteen ounces.

Additional ingredients of the nature of glue, molasses, glucose, glycerine harden and toughen the sponge and prevent crumbling and efflorescence. For this purpose I prefer glue and glucose, as follows:

Formula No. 4: Of plaster-of-paris, twenty-four ounces; of bicarbonate of soda, one-half ounce; of glue, one-fourth ounce; of water, eighteen ounces.

Formula No. 5: Of plaster-of-paris, twenty-four ounces; of bicarbonate of soda, four-elevenths of an ounce; of glucose, one-half ounce; of water, sixteen ounces.

Formula No. 6: Of plaster-of-paris, twenty-four ounces; of bicarbonate of soda, one-half ounce; of glucose, one-half ounce; of glue, one-fourth ounce; of water, eighteen ounces.

Formula No. 7: Of plaster-of-paris, twenty-four ounces; of bicarbonate of soda, one-half ounce; of flour, one-half ounce; of glucose, one-half ounce; of water, eighteen ounces.

Formula No. 8: Of plaster-of-paris, twenty-four ounces; of bicarbonate of soda, nine-sixteenths of an ounce; of rosin, one-half ounce; of glucose, one-half ounce; of glue, one-fourth ounce; of water, eighteen ounces.

To increase the bulk and to lighten and cheapen the composition, and in some cases to strengthen it, I have used with the ingredients named other materials, such as paper-pulp, charcoal, coke, cinders, shavings, sawdust, hay, straw, chaff, hulls of grain and rice, or hair, the following being an illustration:

Formula No. 9: Of plaster-of-paris, twenty-four ounces; of bicarbonate of soda, three-fourths of an ounce; of rosin, one-half ounce; of glucose, one-half ounce; of glue, one-fourth ounce; of water, eighteen ounces; of paper-pulp, (wet,) four ounces.

The use of the ingredients in addition to those of Formula No. 1 will more or less increase the time required for the setting or hardening of the compositions, all of which will set or harden naturally, but afterward require drying to get free of the superfluous moisture. The drying referred to may be by exposure to the open air or to a moderate heat.

I have also, in connection with the above ingredients, used additional ingredients, among which are sulphuric acid, sulphate of iron, sulphate of zinc, alum, acetate of lead, all of which, with an increase of bicarbonate of soda, furnished an increased quantity of carbonic-acid gas, and all of which, in proper proportions, may be used as a sponge or leaven to mix with other ingredients, such as cement, clay, ashes, for the purpose of rendering them light and porous and causing them to harden or set.

As the effervescence is produced by chemical combination of some of the acid and alkali of the respective ingredients, it is necessary, in order to obtain the best results, that the proper proportions of each ingredient should be used, for if the action is too violent and the mixture too thin or wet all or too much of the gas will escape before the setting process takes place, and, on the other hand, if the action be too sluggish or the mixture too stiff or dry an insufficient amount of gas will be evolved, and in either case the desired porosity will not be obtained. Expertness, in this respect, of the operator will best be attained by practice.

To obtain the greatest degree of porosity the operator should aim to proportion the ingredients so as to obtain the largest quantity of gas that can be retained in the sponge until it sets, and without having the sponge settle.

In preparing these various mixtures those ingredients containing an excess of acid should be kept separate from those of an alkaline nature, either being in a moist state, until the final combination is to be made. For instance, in Formula No. 1 the plaster-of-paris and the bicarbonate of soda may be well mixed in a dry state, and then the water added and the ingredients mixed; or the bicarbonate of soda may be first dissolved in the water and then this solution mixed with the plaster-of-paris; or the plaster-of-paris and water may be mixed and the bicarbonate of soda quickly added and mixed; but this latter mode is not preferable, as the sponge is apt to be irregular in structure.

In compounding Formula No. 9 the dry ingredients—plaster-of-paris and bicarbonate of soda—may be mixed; then a mixture of all the other ingredients may be made, and then the two mixtures mixed together; or the bicarbonate of soda may be included in the last and wet mixture. The glue and glucose should first be well dissolved in some of the eighteen ounces of water.

It is best to make separate solutions of the requisite strength of all the ingredients that require to be dissolved, and then combine these solutions, being careful to preserve the proper proportions of the solutions and ingredients. The glue and glucose and bicarbonate of soda should not be brought into contact until the combined solution is in its most diluted state, in order that the bicarbonate of soda may not injure the properties of the glue and glucose; but contact of the rosin with a strong solution of bicarbonate of soda is beneficial.

In applying the ingredients of the sponge to other and more bulky materials as a leaven for them, the proportion of the ingredients must be proportioned to the nature and quantity of said materials and to the purposes desired. In such applications the proper proportions can be arrived at only by experiment and observation in such special applications.

The above instructions, with ordinary observation and reflection, will enable any one to properly prepare and use the other described mixtures, as well as similar ones that may be required.

In all cases the final mixing of each mixture should be made as quickly as a thorough mixing will permit. It should then be quickly poured where wanted and allowed to remain unagitated until it has finally set.

The composition may be run into molds of any desired shape, and then when the substance has hardened and dried sufficiently the castings may be applied in sections, or as desired; or it may be run into or on the place where it is wanted, and allowed to harden there by applying proper means to confine and hold it in position until it sets.

The proportions of the ingredients of the described mixtures are applicable to castings of a thickness vertically of two or three inches or more. When running thinner castings the mixture can be made more active by using more bicarbonate of soda, and thereby a greater degree of lightness secured. One bulk of the sponge exceeds that of the ingredients fifty to one hundred and fifty per cent.

The sponge may be prevented from absorbing water or other fluids by giving it, when dry, a coating of rosin, sulphur, or other suitable waterproofing material, or by inclosing it in a thin metal casing.

I claim—

1. The combination of plaster-of-paris, water, and a soluble alkaline bicarbonate, as and for the purpose described.

2. In combination with plaster-of-paris, water, and a soluble alkaline bicarbonate, flour or pulverized rosin, as and for the purpose described.

3. In combination with plaster-of-paris, water, and a soluble alkaline bicarbonate, glue or glucose, as and for the purpose of hardening and toughening the composition.

4. The combination of plaster-of-paris, water, a soluble alkaline bicarbonate, glue or glucose, and flour or pulverized rosin, substantially as described, and for the purpose of lightening, hardening, and toughening the composition.

5. In combination with plaster-of-paris, water, and bicarbonate of soda, paper-pulp, for the purpose described.

6. In combination with plaster-of-paris, water, and bicarbonate of soda, paper-pulp and pulverized rosin, substantially as described.

7. In combination with plaster-of-paris, water, and bicarbonate of soda, paper-pulp, pulverized rosin, and glue, substantially as described.

8. As a new manufacture, the herein-described porous cellular mineral sponge.

9. The herein-described mode of manufacturing mineral sponge, which consists in combining plaster-of-paris, bicarbonate of soda, and water, substantially as described.

D. W. C. SANFORD.

Witnesses:
C. D. MOODY,
PAUL BAKEWELL.